(12) United States Patent
Abe

(10) Patent No.: US 9,174,135 B2
(45) Date of Patent: Nov. 3, 2015

(54) STORAGE MEDIUM HAVING STORED THEREIN GAME PROGRAM, GAME APPARATUS, GAME SYSTEM, AND GAME PROCESSING METHOD

(71) Applicant: NINTENDO CO., LTD., Kyoto (JP)

(72) Inventor: Goro Abe, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 159 days.

(21) Appl. No.: 13/911,315

(22) Filed: Jun. 6, 2013

(65) Prior Publication Data

US 2014/0206445 A1 Jul. 24, 2014

(30) Foreign Application Priority Data

Jan. 22, 2013 (JP) ................................. 2013-009147

(51) Int. Cl.
*A63F 9/24* (2006.01)
*A63F 13/26* (2014.01)
*A63F 13/5252* (2014.01)
*A63F 13/92* (2014.01)

(52) U.S. Cl.
CPC ............. *A63F 13/26* (2014.09); *A63F 13/5252* (2014.09); *A63F 13/92* (2014.09); *A63F 2300/8011* (2013.01)

(58) Field of Classification Search
CPC . A63F 2300/577; A63F 13/005; A63F 13/00; A63F 2300/634; A63F 2300/66; A63F 2300/6653; A63F 2300/6676; A63F 13/2145; A63F 2300/636

USPC ........................................................... 463/31
See application file for complete search history.

(56) References Cited

U.S. PATENT DOCUMENTS

| | | | | |
|---|---|---|---|---|
| 6,966,837 | B1* | 11/2005 | Best | 463/33 |
| 7,445,549 | B1* | 11/2008 | Best | 463/32 |
| 2006/0111182 | A1 | 5/2006 | Nakanishi et al. | |
| 2007/0117617 | A1* | 5/2007 | Spanton et al. | 463/29 |
| 2007/0273714 | A1* | 11/2007 | Hodge et al. | 345/690 |
| 2009/0305783 | A1* | 12/2009 | Yoshino et al. | 463/31 |
| 2011/0124401 | A1* | 5/2011 | Durham et al. | 463/25 |

FOREIGN PATENT DOCUMENTS

JP 2006-141723 6/2006

* cited by examiner

*Primary Examiner* — Steve Rowland
(74) *Attorney, Agent, or Firm* — Nixon & Vanderhye P.C.

(57) ABSTRACT

An input is acquired, and in accordance with the input, a sequence of game processing from beginning a predetermined game to obtaining a result of the game is performed. Then, a game image corresponding to the game processing from the beginning of the game to a state of the game still in progress is displayed on the portable display apparatus. A game image corresponding to at least part of the game processing from the beginning of the game to the state of the game still in progress is redisplayed on another display apparatus, and thereafter, a game image corresponding to the game processing until the obtaining of the result of the game is displayed on the other display apparatus.

16 Claims, 10 Drawing Sheets

FIG. 3
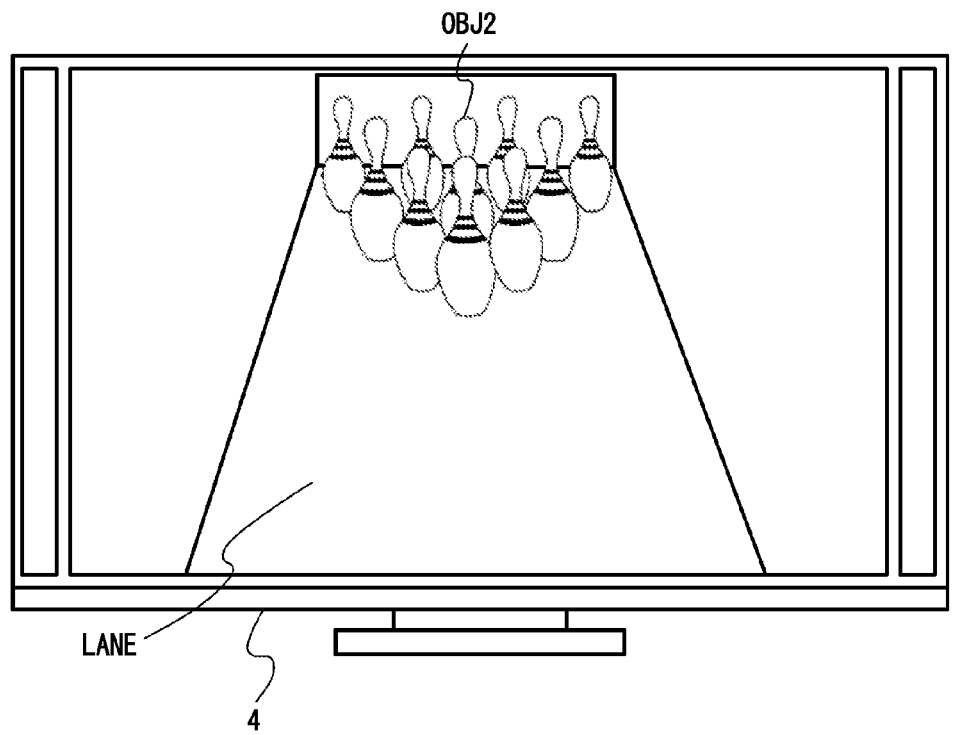
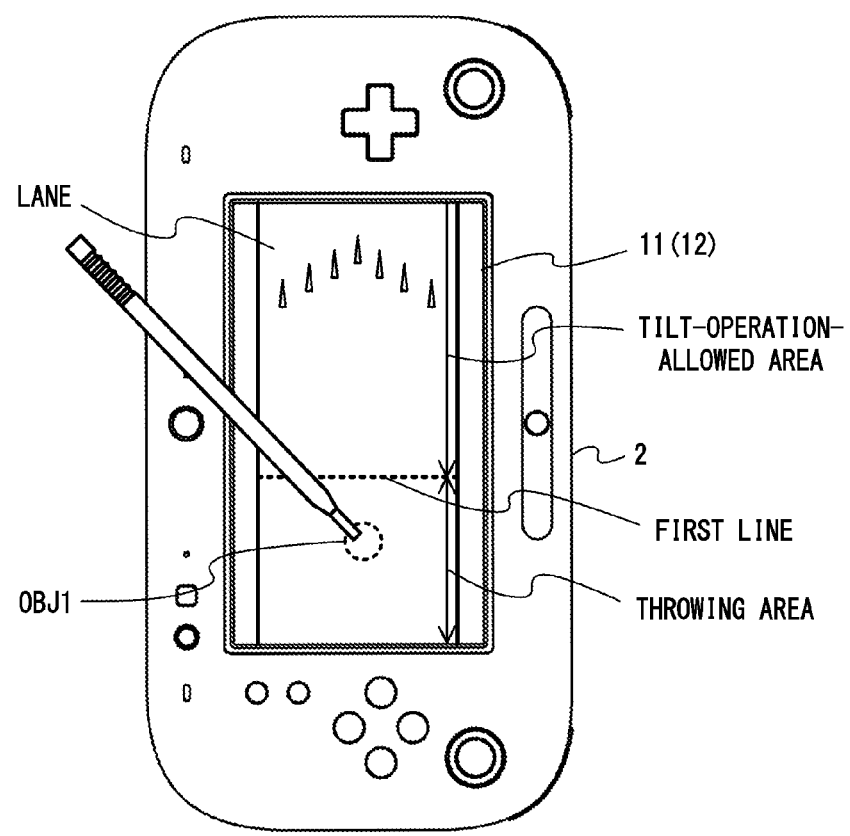

FIG. 5
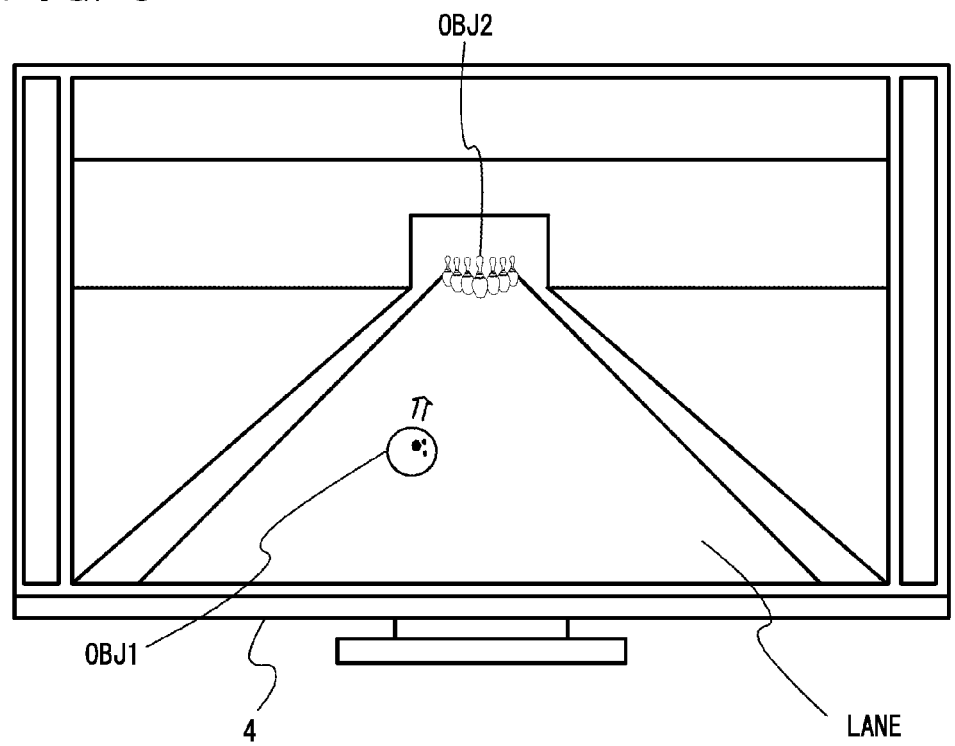
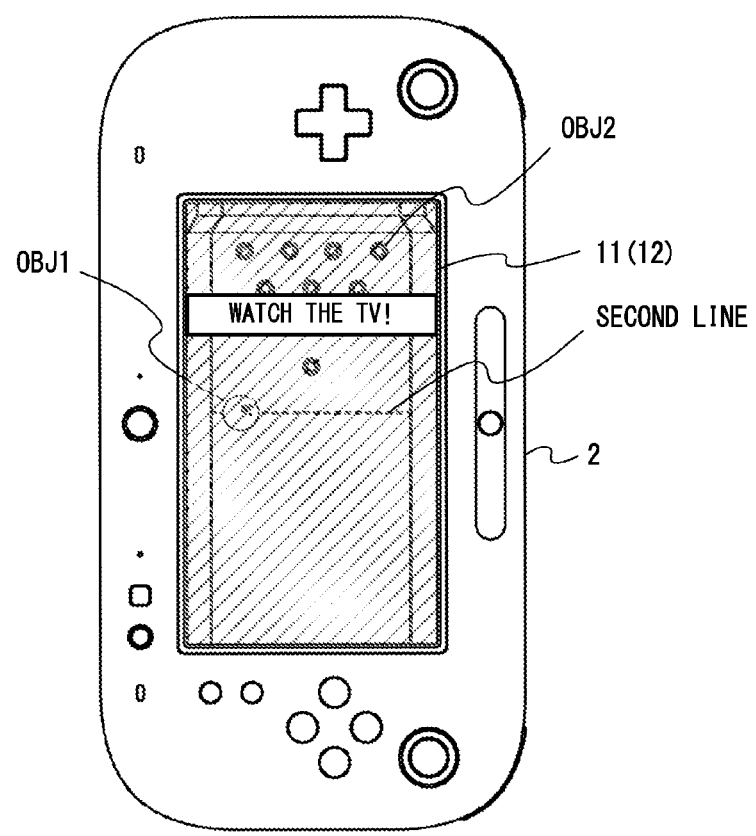

FIG. 6
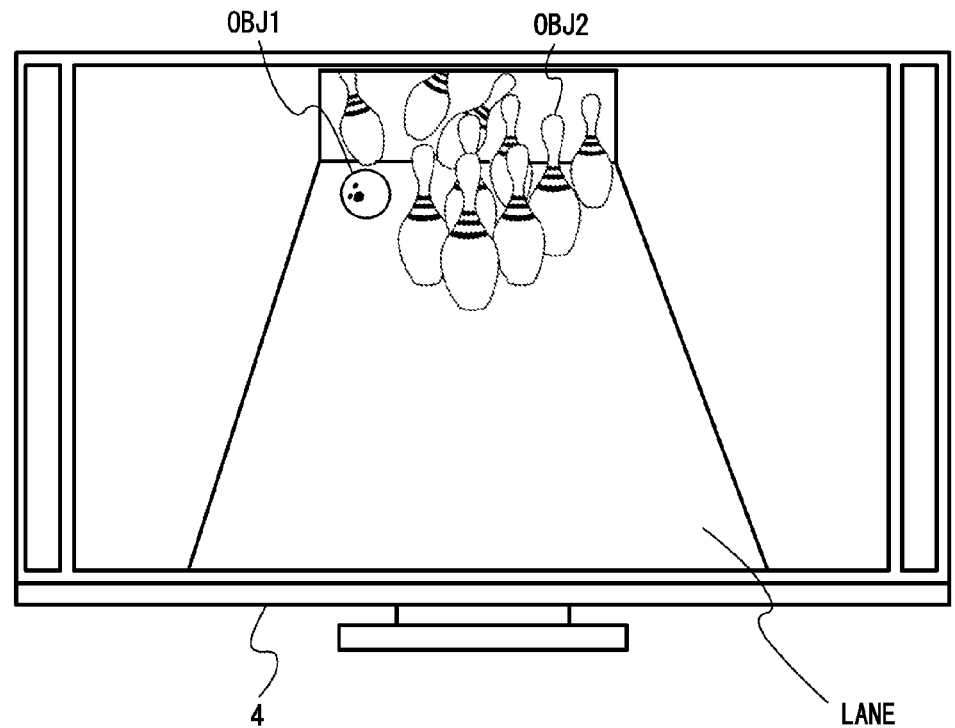
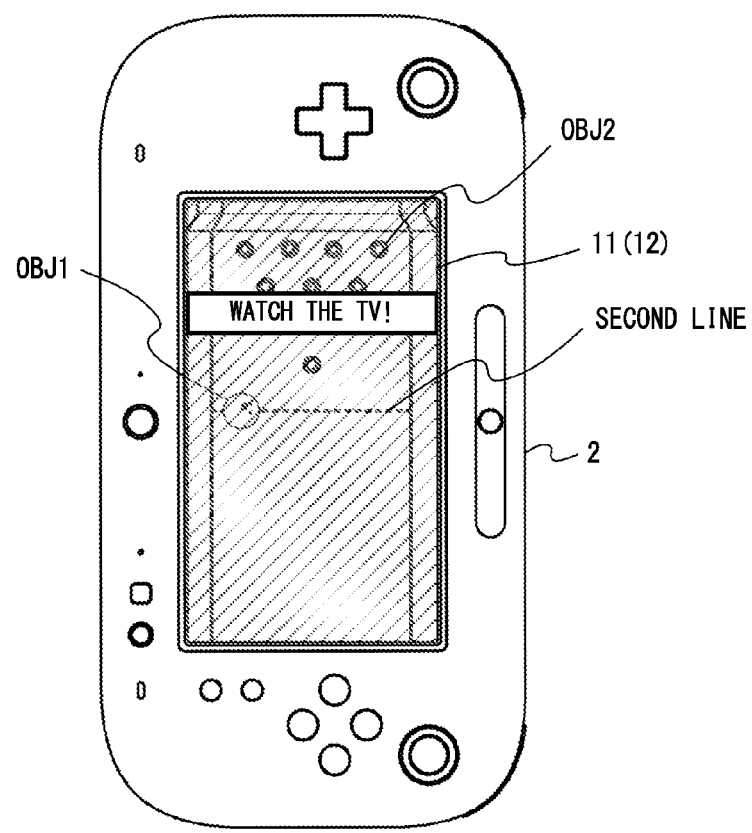

STORAGE MEDIUM HAVING STORED THEREIN GAME PROGRAM, GAME APPARATUS, GAME SYSTEM, AND GAME PROCESSING METHOD

CROSS REFERENCE TO RELATED APPLICATION

The disclosure of Japanese Patent Application No. 2013-009147, filed on Jan. 22, 2013, is incorporated herein by reference.

FIELD

The technology shown here relates to a storage medium having stored therein a game program, a game apparatus, a game system, and a game processing method, and in particular, relates to a storage medium having stored therein a game program that, for example, performs a predetermined game in a virtual world, and a game apparatus, a game system, and a game processing method that, for example, perform a predetermined game in a virtual world.

BACKGROUND AND SUMMARY

Conventionally, there is a hand-held game apparatus for individually enjoying a game.

The hand-held game apparatus, however, displays the content of the game in the player's hands. This allows only a person who can view the hand-held game apparatus to enjoy the game.

Therefore, it is an object of an exemplary embodiment to provide a storage medium having stored therein a game program that allows not only a person who can view a portable display apparatus to enjoy the content of a game, but also another person to share the content of the game, and a game apparatus, a game system, and a game processing method that allow not only a person who can view a portable display apparatus to enjoy the content of a game, but also another person to share the content of the game.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of a non-transitory computer-readable storage medium having stored therein a game program according to the exemplary embodiment, the game program is executed by a computer of an apparatus for causing an image to be displayed on each of a portable display apparatus and another display apparatus. The game program causes the computer to execute: acquiring an input; performing, in accordance with the input, a sequence of game processing from beginning a predetermined game to obtaining a result of the game; displaying on the portable display apparatus a game image corresponding to the game processing from the beginning of the game to a state of the game still in progress; and redisplaying on the other display apparatus a game image corresponding to at least part of the game processing from the beginning of the game to the state of the game still in progress, and thereafter displaying on the other display apparatus a game image corresponding to the game processing until the obtaining of the result of the game. It should be noted that the game image redisplayed in the display on the other display apparatus may be the same as the game image displayed in the display on the portable display apparatus, or may be different from the game image displayed in the display on the portable display apparatus (for example, may have a different viewpoint, a different direction of the line of sight, or the like).

On the basis of the above, a game image representing game processing until the state of a game still in progress is displayed on a portable display apparatus, and an image representing the result of the game is displayed on another display apparatus. This enables not only a person who can view the portable display apparatus to enjoy the content of the game, but also another person to share the content of the game.

In addition, in the display on the other display apparatus, after the game image corresponding to the game processing from the beginning of the game to the state of the game still in progress is displayed in the display on the portable display apparatus, the game image corresponding to the at least part of the game processing from the beginning of the game to the state of the game still in progress may be redisplayed on the other display apparatus.

On the basis of the above, the person viewing the portable display apparatus can view the game image displayed on the other display apparatus after viewing the game image displayed on the portable display apparatus.

In addition, in the display on the portable display apparatus, after the game image corresponding to the game processing from the beginning of the game to the state of the game still in progress is displayed, a visibility of an image to be displayed on the portable display apparatus may be reduced.

On the basis of the above, the visibility of an image to be displayed on the portable display apparatus is reduced. This makes it possible to prompt the person viewing the portable display apparatus to view the game image displayed on the other display apparatus.

In addition, in the display on the portable display apparatus, the visibility of the image to be displayed on the portable display apparatus may be reduced by reducing a brightness of the image.

On the basis of the above, the reduction in brightness of the image makes it possible to easily reduce the visibility of the image to be displayed on the portable display apparatus.

In addition, in the display on the portable display apparatus, the visibility of the image to be displayed on the portable display apparatus may be reduced by hiding the image.

On the basis of the above, the hiding of the image on the portable display apparatus makes it possible to prompt the person viewing the portable display apparatus to view the game image displayed on the other display apparatus.

In addition, in the display on the portable display apparatus, after the game image corresponding to the game processing from the beginning of the game to the state of the game still in progress is displayed, a stopped image may be displayed on the portable display apparatus, the stopped image obtained by stopping progression of the game at the time of the state of the game still in progress.

On the basis of the above, a game image obtained by stopping the progression of the game at the time of the state of the game still in progress is displayed on the portable display apparatus. This makes it possible to prompt the person viewing the portable display apparatus to view the game image displayed on the other display apparatus, and allow the person to expect the subsequent progression of the game.

In addition, in the performance of the sequence of the game processing, the sequence of the game processing may be performed in accordance with the input acquired from the beginning of the game to a predetermined time before the result of the game is obtained. In this case, in the display on the portable display apparatus, a game image corresponding to the game processing from the beginning of the game to the predetermined time may be displayed on the portable display apparatus.

On the basis of the above, only a game image corresponding to a period during which a game operation is allowed is displayed on the portable display apparatus. This makes it possible to inform, by the game image displayed on the portable display apparatus, a user of whether or not the game operation is allowed.

In addition, in the display on the other display apparatus, a game image may be displayed on the other display apparatus, the game image obtained by viewing a virtual world from a direction different from a direction from which the game image displayed in the display on the portable display apparatus is viewed.

On the basis of the above, the person viewing the portable display apparatus views the game image displayed on the portable display apparatus and the game image displayed on the other display apparatus, and thereby can enjoy a virtual world from different directions.

In addition, in the display on the other display apparatus, while the game image corresponding to the game processing from the beginning of the game to the state of the game still in progress is displayed in the display on the portable display apparatus, a game image may be displayed on the other display apparatus, the game image including a location where the result of the game is represented.

On the basis of the above, even while a game image representing the game processing until the state of the game still in progress is displayed on the portable display apparatus, it is possible to confirm a game target by viewing the game image displayed on the other display apparatus.

In addition, in the display on the portable display apparatus, a game image may be displayed on the portable display apparatus, the game image obtained by changing a viewpoint of the game image with a direction of a line of sight of the game image fixed until the state of the game still in progress.

In addition, the other display apparatus may be a stationary display apparatus.

On the basis of the above, the result of the game is displayed on a stationary display apparatus. This enables the person to share the result of the game with another person who can view the stationary display apparatus.

In addition, in the acquisition of the input, an input using the portable display apparatus may be acquired.

On the basis of the above, a game image representing game processing until the state of a game still in progress is displayed on a portable display apparatus for providing an input, and an image representing the result of the game is displayed on another display apparatus. This enables not only a user operating the portable display apparatus to enjoy the content of the game, but also another person to share the content of the game.

In addition, the exemplary embodiment may be carried out in the forms of a game apparatus and an information processing system that include units configured to perform the above operations, and a game processing method including the above operations.

On the basis of the exemplary embodiment, a game image representing game processing until the state of a game still in progress is displayed on a portable display apparatus, and an image representing the result of the game is displayed on another display apparatus. This enables not only a person who can view the portable display apparatus to enjoy the content of the game, but also another person to share the content of the game.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 3 is a diagram showing non-limiting examples of game images of a virtual world displayed on a terminal apparatus 2 and a monitor 4;

FIG. 5 is a diagram showing non-limiting examples of the game images of the virtual world displayed on the terminal apparatus 2 and the monitor 4;

FIG. 6 is a diagram showing non-limiting examples of the game images of the virtual world displayed on the terminal apparatus 2 and the monitor 4;

DETAILED DESCRIPTION OF NON-LIMITING EXAMPLE EMBODIMENTS

Figure 1:
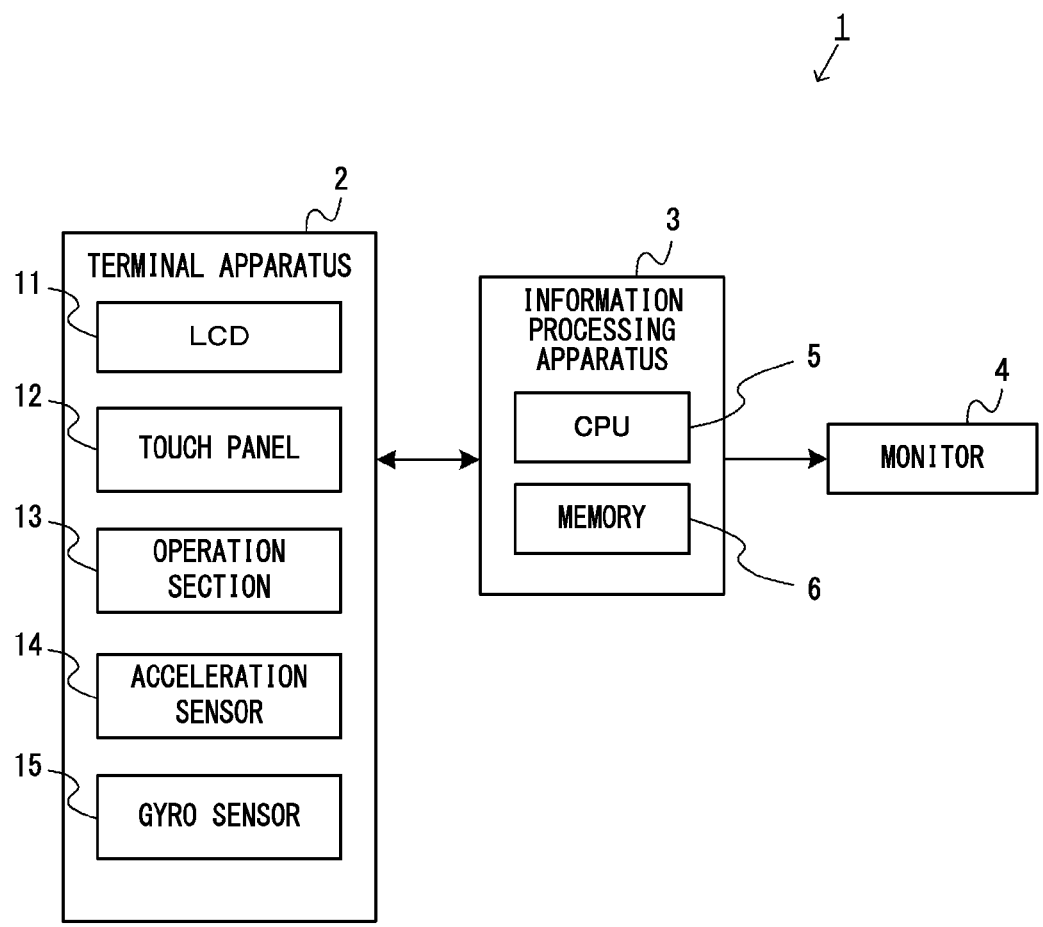
FIG. 1 is a block diagram showing a non-limiting example of an information processing system 1.

With reference to FIG. 1, a description is given of an information processing apparatus for executing a game program and an information processing system including the information processing apparatus, according to an exemplary embodiment. It should be noted that FIG. 1 is a block diagram showing an example of an information processing system 1 including an information processing apparatus 3. As an example, the information processing apparatus 3 is composed of a stationary game apparatus, and the information processing system 1 is composed of a game system including the stationary game apparatus.

In FIG. 1, the information processing system 1 includes a terminal apparatus 2, the information processing apparatus 3, and a monitor 4. The information processing system 1 according to the exemplary embodiment generates images (for example, game images) and displays the images on display apparatuses (the terminal apparatus 2 and the monitor 4).

In the information processing system 1, the information processing apparatus 3 executes information processing in accordance with an input to the terminal apparatus 2, and the images obtained as a result of the execution of the information processing are displayed on the terminal apparatus 2 and/or the monitor 4. As described above, in the exemplary embodiment, the information processing system 1 is configured to achieve an input function, an information processing function, and a display function by a plurality of apparatuses. It should be noted that in another exemplary embodiment, the configuration of the information processing system 1 may be such that the monitor 4 is connected, using wired or wireless communication, to a single information processing apparatus (for example, a portable information processing apparatus) having these functions.

The terminal apparatus 2 is an input apparatus that can be held by a user (a portable input apparatus). The terminal apparatus 2 is capable of communicating with the information processing apparatus 3. The terminal apparatus 2 transmits operation data representing the operation on the terminal apparatus 2 to the information processing apparatus 3. Further, in the exemplary embodiment, the terminal apparatus 2 includes a display section (an LCD 11), and therefore, the terminal apparatus 2 serves also as a display apparatus. When an image has been transmitted from the information processing apparatus 3, the terminal apparatus 2 displays the image on the LCD 11.

In addition, the terminal apparatus 2 includes a touch panel 12 and an operation section 13 as an input section. For example, the touch panel 12 detects the position of an input provided to a predetermined input surface (for example, a display screen of the LCD 11) provided in a housing of the terminal apparatus 2. Further, as an example, the operation section 13 includes an analog stick, a directional pad, an operation button, and the like.

In addition, the terminal apparatus 2 also includes an acceleration sensor 14 in the input section. The acceleration sensor 14 detects the acceleration of the terminal apparatus 2 in a predetermined axial direction (which is three axial directions in the exemplary embodiment, but may only need to be one or more axial directions). Further, the terminal apparatus 2 also includes a gyro sensor 15 in the input section. The gyro sensor 15 detects the angular velocity of the rotation of the terminal apparatus 2 about a predetermined axial direction (which is three axial directions in the exemplary embodiment, but may only need to be one or more axial directions). The acceleration sensor 14 and the gyro sensor 15 are sensors that detect information for calculating the orientation of the terminal apparatus 2 (information enabling the calculation or the estimation of the orientation). It should be noted that in another exemplary embodiment, the orientation of the terminal apparatus 2 may be calculated by any method. The orientation of the terminal apparatus 2 may be calculated using another sensor other than the above sensors, or using a camera capable of capturing the terminal apparatus 2.

The information processing apparatus 3 performs various types of information processing performed in the information processing system 1, such as the process of generating an image. In the exemplary embodiment, the information processing apparatus 3 has a CPU (control section) 5 and a memory 6. The CPU 5 executes a predetermined information processing program (for example, a game program) using the memory 6, thereby achieving various functions of the information processing apparatus 3. It should be noted that the information processing apparatus 3 may have any configuration so long as it can perform the information processing described above. In the exemplary embodiment, the information processing apparatus 3 generates images (for example, game images) and outputs the generated images to the terminal apparatus 2 and the monitor 4, which serve as display apparatuses.

The monitor 4 is an example of a display apparatus that displays a generated image. The monitor 4 is capable of receiving data transmitted from the information processing apparatus 3. When an image generated by the information processing apparatus 3 has been transmitted to the monitor 4, the monitor 4 displays the image.

Figure 2:
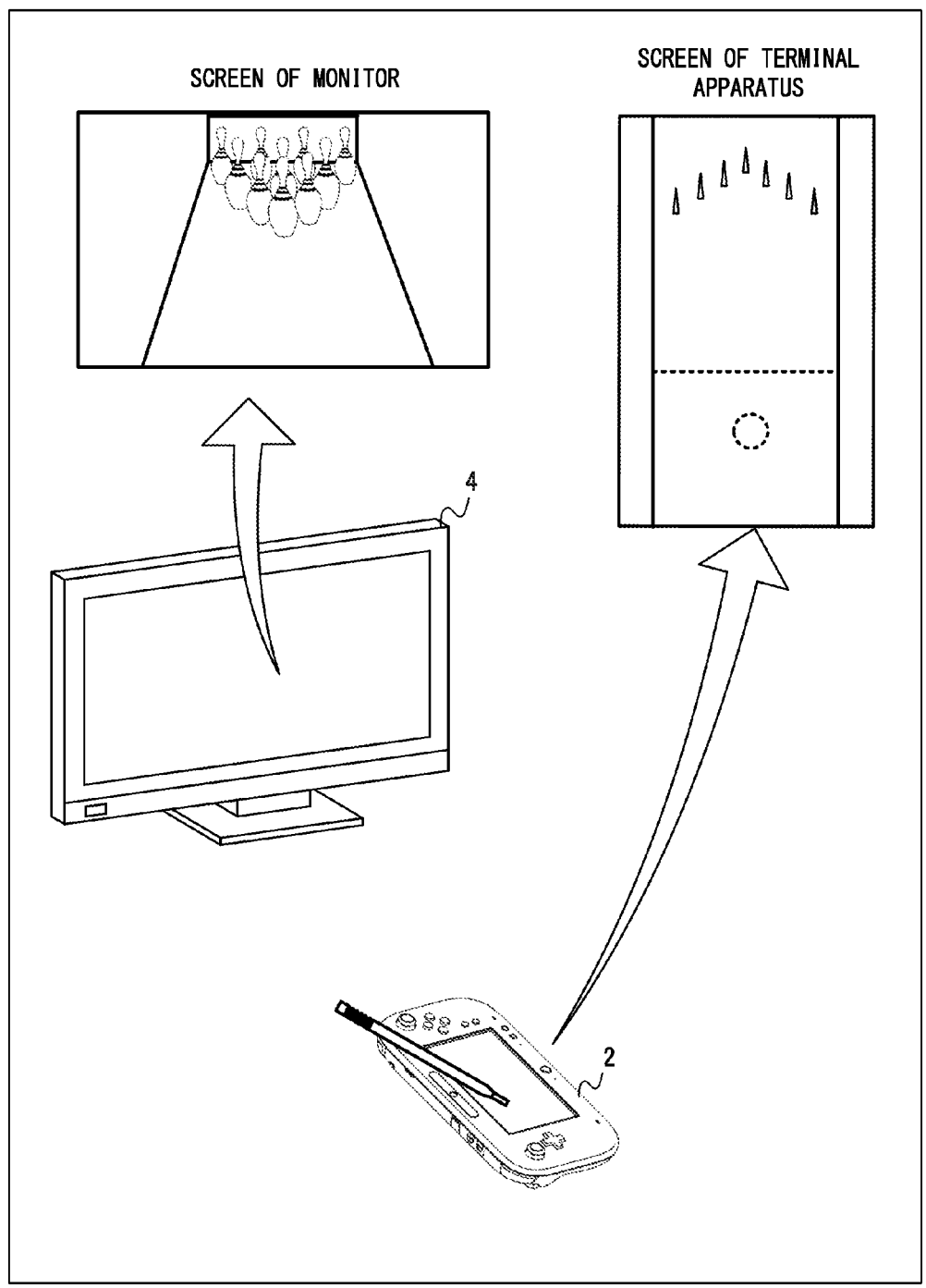
FIG. 2 is a diagram showing non-limiting examples of images displayed in the information processing system 1.
Figure 7:
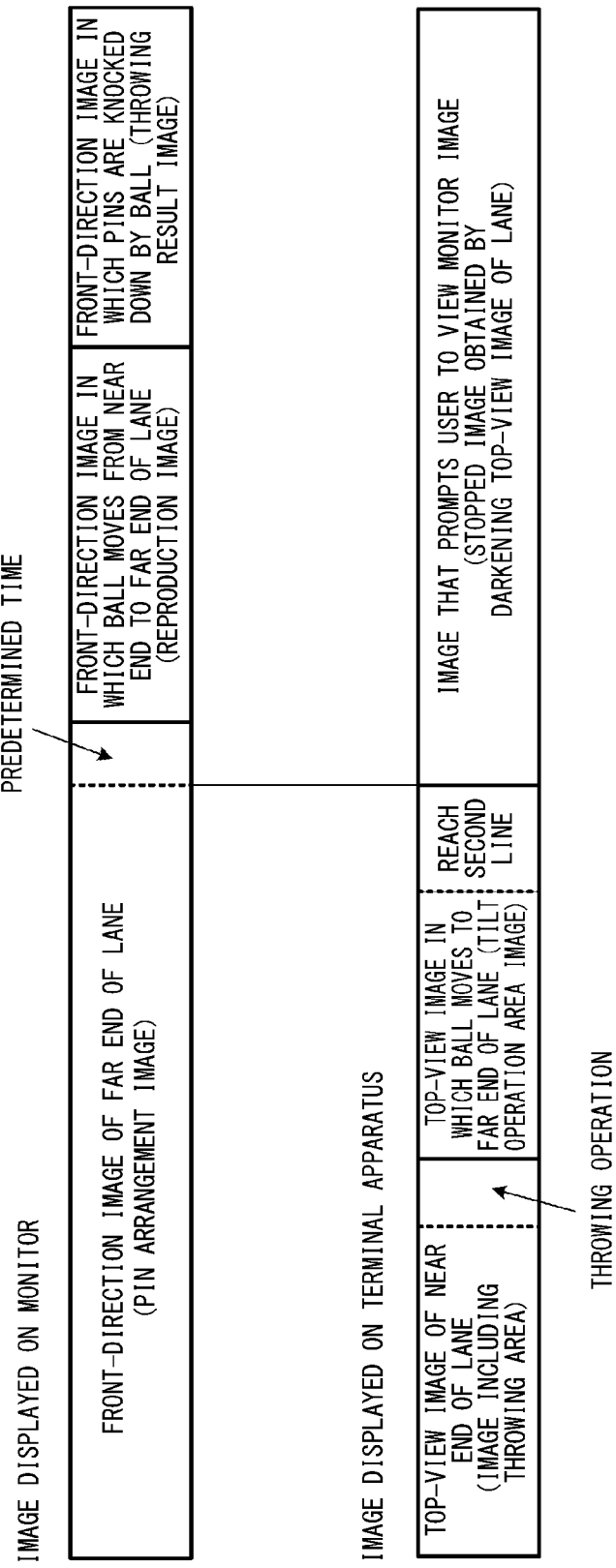
FIG. 7 is a diagram showing non-limiting examples of the chronological changes in the game images displayed on the terminal apparatus 2 and the monitor 4.

Next, with reference to FIGS. 2 through 7, a description is given of an overview of the information processing performed by the information processing apparatus 3, before the description of specific processing performed by the information processing apparatus 3. It should be noted that the following descriptions are given taking, as an example of the information processing, game processing for performing a bowling game of throwing a ball object OBJ1 by targeting pin objects OBJ2. FIG. 2 is a diagram showing examples of images (game images) displayed in the information processing system 1. FIGS. 3 through 6 are diagrams showing examples of game images of a virtual world displayed on the terminal apparatus 2 and the monitor 4. FIG. 7 is a diagram showing the chronological changes in the game images displayed on the terminal apparatus 2 and the monitor 4.

As shown in FIG. 2, in the exemplary embodiment, as an example, a game image is displayed on each of the terminal apparatus 2 and the monitor 4. For example, the user performs a touch operation on the touch panel 12 while holding the terminal apparatus 2 such that the display screen of the terminal apparatus 2 is horizontal, and then performs the operation of tilting the terminal apparatus 2 from the horizontal state. Thus, the user can operate an object placed in a virtual world displayed on the terminal apparatus 2 and the monitor 4.

FIG. 3 shows examples of game images displayed on the terminal apparatus 2 and the monitor 4 when the user performs the operation of throwing a ball object OBJ1 in the bowling game. As shown in FIGS. 3 and 7, on the monitor 4, for example, a game image (a pin arrangement image) is displayed in which a plurality of pin objects OBJ2 arranged at the far end (on a so-called pin deck) of a lane used in the bowling game are viewed in the direction of throwing the ball object OBJ1 (hereinafter, this direction is referred to as a "front direction"). Here, on the monitor 4, the pin deck is mainly displayed on which the pin objects OBJ2 are arranged to serve as targets to be knocked down by causing the ball object OBJ1 to collide with them. In other words, the pin deck is a space for placing targets (game targets) that serve as the targets of movement of an operation object when a game is performed. Thus, a space for throwing the ball object OBJ1, that is, a space for placing the operation object to be operated when the game is performed, is not displayed because the space is outside the display area.

On the other hand, on the LCD 11 of the terminal apparatus 2, for example, the lane used in the bowling game is displayed such that the front-back direction of the lane is the left-right direction of the terminal apparatus 2, and a game image (an image including a throwing area) is displayed in which the near end of the lane (that is, a part of the lane across a throwing foul line in the front-back direction) is viewed from above (hereinafter, this direction is referred to as a "top-view direction"). In the lane displayed on the LCD 11, the throwing area is set on the near side of a first line, which corresponds to the foul line in bowling, and a tilt-operation-allowed area is set on the far side of the first line. The throwing area is an area for performing a touch operation on the inside of the throwing area via the touch panel 12, thereby enabling the throwing of the ball object OBJ1 forward in the lane. As an example, the user of the terminal apparatus 2 performs a touch operation on the inside of the throwing area so as to slide from the near end to the far end of the lane, thereby throwing the ball object OBJ1 to the far end of the lane in a throwing direction based on the direction of the slide operation and at a throwing speed based on the speed of the slide operation. Further, the tilt-operation-allowed area is an area allowing a change in the moving direction of the ball object OBJ1 after being thrown, by performing the operation of tilting the body of the terminal apparatus 2.

Figure 4:
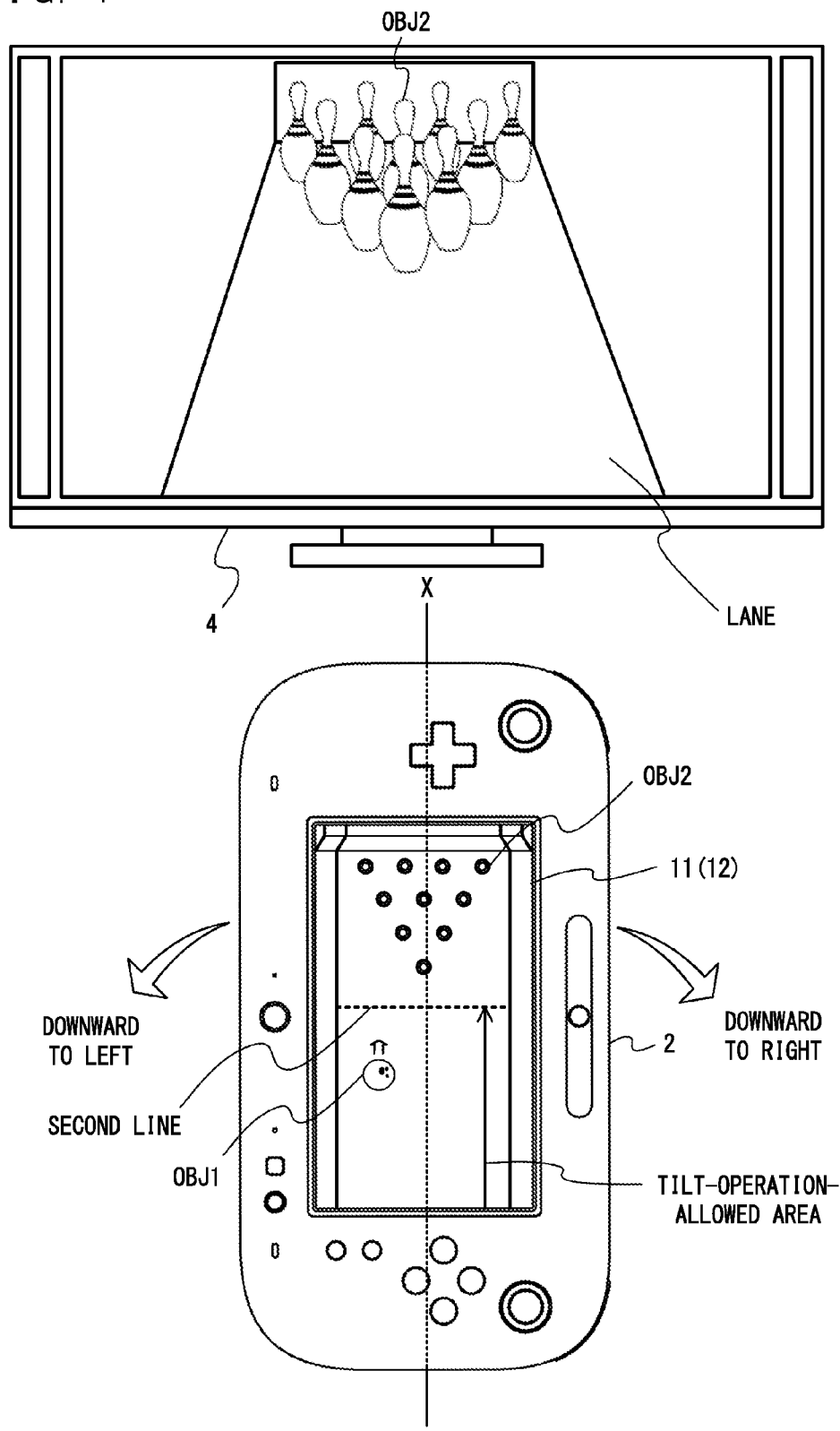
FIG. 4 is a diagram showing non-limiting examples of the game images of the virtual world displayed on the terminal apparatus 2 and the monitor 4.

As shown in FIG. 4, while the ball object OBJ1 is moving in the tilt-operation-allowed area, it is possible to change the moving direction of the ball object OBJ1 by tilting the body of the terminal apparatus 2 about a predetermined axis of the terminal apparatus 2 (for example, an X-axis shown in FIG. 4, which is the left-right direction of the terminal apparatus 2) from the horizontal state. Specifically, the moving direction of the ball object OBJ1 changes such that the ball object OBJ1 curves in the direction of tilting the lane, displayed on the LCD 11, to the left or right from the horizontal state, and by a degree based on the angle of tilt from the horizontal state. For example, if the user tilts the terminal apparatus 2 about the X-axis shown in FIG. 4 such that the lane displayed on the LCD 11 is downward to the right, the moving direction of the ball object OBJ1 is set such that the ball object OBJ1 moving in the tilt-operation-allowed area curves to the right in accordance with the angle of tilt downward to the right from the horizontal state. It should be noted that as shown in FIG. 4, the tilt-operation-allowed area allowing an operation on the moving direction of the ball object OBJ1 is set in an area extending to a second line provided on the near side of the pin deck on which the pin objects OBJ2 are arranged. Thus, after the ball object OBJ1 reaches the second line, it is not possible to perform the operation of changing the moving direction of the ball object OBJ1.

As shown in FIGS. 3, 4, and 7, while the ball object OBJ1 is moving in the tilt-operation-allowed area, on the monitor 4, the game image (the pin arrangement image) continues to be displayed in which the plurality of pin objects OBJ2 arranged on the pin deck are viewed in the front direction, and the game image does not change in accordance with the movement of the ball object OBJ1. On the other hand, on the LCD 11 of the terminal apparatus 2, a game image (a tilt operation area image) is displayed that is obtained by moving its viewpoint to the far end of the lane in accordance with the movement of the ball object OBJ1 and viewing the lane and the ball object OBJ1 in the top-view direction.

As shown in FIGS. 5 and 7, if the ball object OBJ1 has reached the second line, the movement of the ball object OBJ1 stops in the game image displayed on the LCD 11 of the terminal apparatus 2. Then, on the LCD 11, a top-view image of the lane is displayed in which the plurality of pin objects OBJ2 are arranged and the ball object OBJ1 is stopped on the second line. Additionally, an image that prompts the user to view the game image displayed on the monitor 4 is displayed. For example, on the LCD 11, an image obtained by reducing the brightness of the top-view image to reduce the visibility of the top-view image (a stopped image obtained by darkening the top-view image of the lane) is displayed, and a character image that prompts the user to view the game image displayed on the monitor 4 (for example, "Watch the TV!") is displayed on the top-view image in a superimposed manner. It should be noted that the method of reducing the visibility of the top-view image may be another method. For example, the visibility may be reduced by increasing the brightness of the top-view image. Alternatively, the visibility may be reduced by changing the saturation or the hue of the top-view image. Yet alternatively, the visibility may be reduced by hiding the top-view image.

Meanwhile, if the ball object OBJ1 has reached the second line, on the monitor 4, a front-direction image (a reproduction image) in which the ball object OBJ1 moves again from the near end (for example, immediately after the throwing) to the far end of the lane is reproduced after a predetermined time has elapsed since the ball object OBJ1 reached the second line. Here, in the game image displayed on the monitor 4, the motion of the ball object OBJ1 moving on the lane is the reproduction of the motion of the ball object OBJ1 once displayed on the LCD 11 of the terminal apparatus 2. This enables the user of the terminal apparatus 2 to view again the motion of the ball object OBJ1 moving on the lane by the operation performed by the user themselves. Further, as shown in FIG. 5, while the ball object OBJ1 is moving in the tilt-operation-allowed area, on the monitor 4, a front-direction game image is displayed that is obtained by once moving the position of the viewpoint in the pin arrangement image to the near end of the lane, and thereafter, a front-direction game image is displayed that is obtained by bringing its viewpoint closer to the ball object OBJ1 in accordance with the position to which the ball object OBJ1 moves when the movement of the ball object OBJ1 is reproduced. Thus, the user of the terminal apparatus 2 can view again from a different angle the motion of the ball object OBJ1 that the user has viewed once on the LCD 11 of the terminal apparatus 2.

As shown in FIGS. 6 and 7, if the ball object OBJ1 has reached the second line again in the reproduction image displayed on the monitor 4, the movement of the ball object OBJ1 from the second line to the far end of the lane continues in accordance with the moving direction and the moving speed of the ball object OBJ1 at the time when the ball object OBJ1 has reached the second line. Then, in accordance with the state of collision between the ball object OBJ1 and the pin objects OBJ2, on the monitor 4, a front-direction game image (a throwing result image) is displayed in which the pin objects OBJ2 fall down. On the other hand, during the period from when the ball object OBJ1 crosses the second line to when the ball object OBJ1 collides with the pin objects OBJ2 and the result of the throwing is displayed, on the LCD 11 of the terminal apparatus 2, the image that prompts the user to view the game image displayed on the monitor 4 continues to be displayed.

Here, the number of pin objects OBJ2 falling down as a result of the collision between the ball object OBJ1 and the pin objects OBJ2 serves as points in one throw in the bowling game, and indicates the result of the game obtained by the operation performed by the user of the terminal apparatus 2. That is, a game image in which the pin objects OBJ2 fall down as a result of the collision between the ball object OBJ1 and the pin objects OBJ2 is an image representing the result of the game of throwing the ball object OBJ1 once by targeting the pin objects OBJ2. Thus, on the monitor 4, after the reproduction image is displayed in which the ball object OBJ1 rolls on the lane, the process is displayed until the result of the game of throwing the ball object OBJ1 once is obtained. This enables not only the user of the terminal apparatus 2 to view the content until the result of the game that the user is playing, but also another person to share the content until the result of the game. On the other hand, on the LCD 11 of the terminal apparatus 2, the process is displayed only until the state of the game still in progress in the sequence of the game from when the operation of throwing the ball object OBJ1 into the lane is performed to when the result of the game using the thrown ball object OBJ1 is obtained. This makes it necessary to view the monitor 4 to know the result of the game. Thus, the user of the terminal apparatus 2 operates the terminal apparatus 2 while viewing it, and is also prompted to view the screen of the monitor 4 to view the result of the operation. This makes it possible to achieve a game where the user themselves uses two display screens. Further, the period until the image that prompts the user to view the game image displayed on the monitor 4 is displayed on the LCD 11 of the terminal apparatus 2 is also the period during which the user can control the action of the ball object OBJ1 by operating the terminal apparatus 2. Thus, the display of the prompting image on the LCD 11 can be used also to inform the user that the operation-allowed period has ended.

It should be noted that the reproduction image displayed on the monitor 4 may be started at any time during the period from when the user throws the ball object OBJ1 into the lane to when the ball object OBJ1 reaches the second line. Further, the reproduction image displayed on the monitor 4 is displayed after a predetermined time has elapsed since the ball object OBJ1 reached the second line in the game image displayed on the terminal apparatus 2. This allows the user of the terminal apparatus 2 sufficient time to shift their eyes from the LCD 11 to the monitor 4. If, however, such effects are not desired, the display of the reproduction image may be started at another time. For example, the display of the reproduction image may be started on the monitor 4 at the same time as the ball object OBJ1 reaches the second line in the game image displayed in the terminal apparatus 2. Alternatively, the display of the reproduction image may be started on the monitor 4 at a predetermined time before the ball object OBJ1 reaches the second line.

In addition, the reproduction image displayed on the monitor 4 may be an image obtained by omitting the state of the game still in progress in the sequence of the game from when the user throws the ball object OBJ1 into the lane to when the pin objects OBJ2 fall down as a result of the collision between the ball object OBJ1 and the pin objects OBJ2. As an example, the reproduction image displayed on the monitor 4 represents the period from when the user throws the ball object OBJ1 into the lane to immediately after the user throws the ball object OBJ1 into the lane. Then, on the monitor 4, an image is displayed that is obtained by omitting the state of the game still in progress in the sequence of the game to represent the period from after the ball object OBJ1 reaches the second line to when the pin objects OBJ2 fall down as a result of the collision between the ball object OBJ1 and the pin objects OBJ2.

Next, a detailed description is given of the information processing (for example, game processing) performed by the information processing apparatus 3. It should be noted that the information processing is described below using an example where game processing is performed on the sequence of the game until the result is obtained of the bowling game of throwing the ball object OBJ1 once by operating the ball object OBJ1 such that the pin objects OBJ2 are the targets of movement of the ball object OBJ1. First, with reference to FIG. 8, a description is given of main data used in the information processing. It should be noted that FIG. 8 is a diagram showing examples of main data and programs stored in the memory 6 of the information processing apparatus 3.

Figure 8:
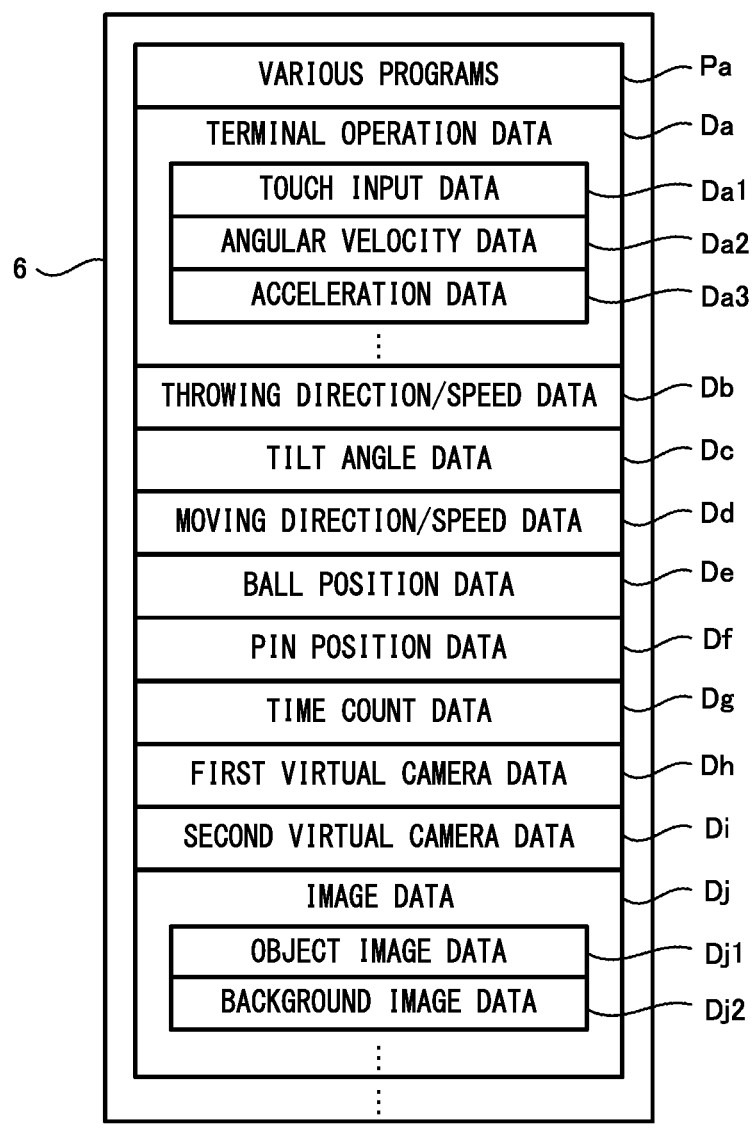
FIG. 8 is a diagram showing non-limiting examples of main data and programs stored in a memory 6 of an information processing apparatus 3.

As shown in FIG. 8, the following are stored in the data storage area of the memory 6: terminal operation data Da; throwing direction/speed data Db; tilt angle data Dc; moving direction/speed data Dd; ball position data De; pin position data Df; time count data Dg; first virtual camera data Dh; second virtual camera data Di; image data Dj; and the like. It should be noted that the memory 6 may store, as well as the data shown in FIG. 8, data and the like necessary for the information processing (the game processing), such as data used in an application to be executed. Further, in the program storage area of the memory 6, various programs Pa included in the information processing program (the game processing) are stored.

The terminal operation data Da has stored therein a series of pieces of operation information (terminal operation data) transmitted as transmission data from the terminal apparatus 2, and is updated to the latest terminal operation data. For example, the terminal operation data Da includes touch input data Da1, angular velocity data Da2, acceleration data Da3, and the like. The touch input data Da1 is data representing the touch position of a touch operation on the touch panel 12, and stores at least data representing the latest touch position and data representing the touch position used in the previous processing. The angular velocity data Da2 is data representing the angular velocity generated in the terminal apparatus 2, and is data representing the angular velocity output from the gyro sensor 15. The acceleration data Da3 is data representing the acceleration generated in the terminal apparatus 2, and is data representing the acceleration output from the acceleration sensor 14.

The throwing direction/speed data Db is data representing the direction (throwing direction) and the speed (throwing speed) of throwing the ball object OBJ1 into the lane, and is stored, for example, as vector data in the virtual world.

The tilt angle data Dc is data representing the angle of tilt of the body of the terminal apparatus 2 from the horizontal state.

The moving direction/speed data Dd is data representing the direction (moving direction) and the speed (moving speed) of the thrown ball object OBJ1 moving on the lane, and is stored, for example, as vector data in the virtual world.

The ball position data De is data representing the position of the ball object OBJ1 moving on the lane, and stores history data of the position of the ball object OBJ1, from when the ball object OBJ1 is thrown into the lane to when the result of the game is obtained.

The pin position data Df is data representing the position of each of the plurality of pin objects OBJ2.

The time count data Dg is data for counting the time elapsed since the ball object OBJ1 reached the second line.

The first virtual camera data Dh is data regarding a first virtual camera placed in the virtual world to obtain a game image to be displayed on the LCD 11 of the terminal apparatus 2, and is data representing the position, the orientation, the viewing angle, and the like of the first virtual camera in the virtual world.

The second virtual camera data Di is data regarding a second virtual camera placed in the virtual world to obtain a game image to be displayed on the monitor 4, and is data representing the position, the orientation, the viewing angle, and the like of the second virtual camera in the virtual world.

The image data Dj includes object image data Dj1, background image data Dj2, and the like. The object image data Dj1 is data for placing objects in the virtual world to generate a game image. The background image data Dj2 is data for placing a background in the virtual world to generate a game image.

Figure 9:
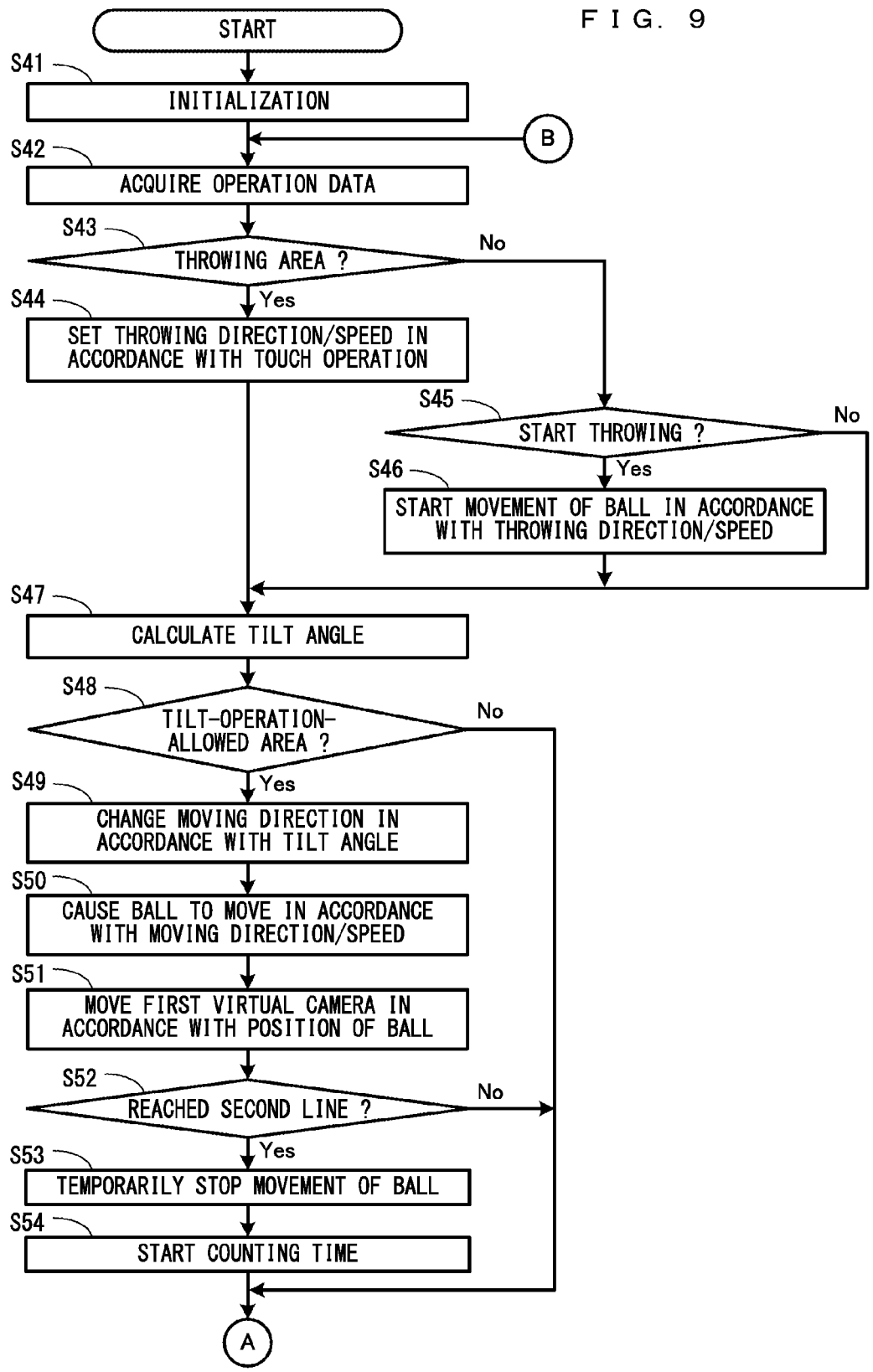
FIG. 9 is a flow chart showing a non-limiting example of the first half of the information processing performed by the information processing apparatus 3.
Figure 10:
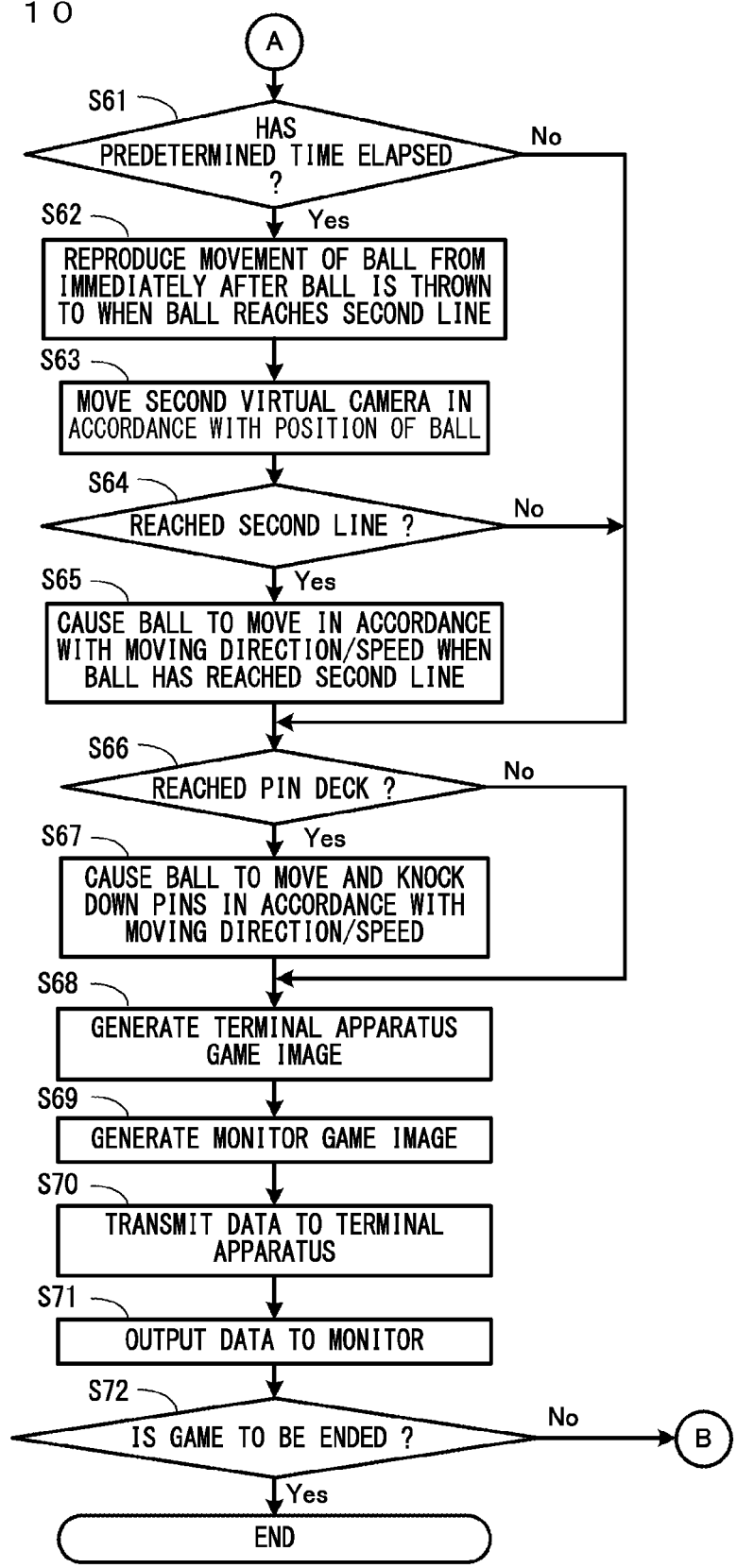
FIG. 10 is a flow chart showing a non-limiting example of the second half of the information processing performed by the information processing apparatus 3.

Next, with reference to FIGS. 9 and 10, a detailed description is given of the information processing (the game processing) performed by the information processing apparatus 3. It should be noted that FIG. 9 is a flow chart showing an example of the first half of the information processing performed by the information processing apparatus 3. FIG. 10 is a flow chart showing an example of the second half of the information processing performed by the information processing apparatus 3. Here, in the flow charts shown in FIGS. 9 and 10, a description is given mainly of, in the information processing performed by the information processing apparatus 3, the process of displaying objects on the terminal apparatus 2 and the monitor 4. Detailed descriptions of other processes not directly related to these processes are omitted.

The CPU 5 initializes the memory 6 and the like, and loads the information processing program stored in a non-volatile memory or an optical disk included in the information processing apparatus 3 into the memory 6. Then, the CPU 5 starts the execution of the information processing program. The flow charts shown in FIGS. 9 and 10 are flow charts showing the processing performed after the above processes are completed.

It should be noted that the processes of all the steps in the flow chart shown in FIGS. 9 and 10 are merely illustrative. Thus, the processing order of the steps may be changed, or another process may be performed in addition to, and/or instead of, the processes of all the steps, so long as similar results are obtained. Further, in the exemplary embodiment, a description is given on the assumption that the CPU 5 performs the processes of all the steps in the flow chart. Alternatively, a processor or a dedicated circuit other than the CPU may perform the processes of some or all of the steps in the flow chart.

Referring to FIG. 9, the CPU 5 performs an initialization process (step 41), and proceeds to the subsequent step. For example, the CPU 5 places a lane and a plurality of pin objects OBJ2 used in a bowling game, thereby constructing a virtual world to be displayed on the terminal apparatus 2 and the monitor 4. Then, the CPU 5 initializes the parameters to be used in the game processing. For example, the CPU 5 places a first virtual camera immediately above the near end of the lane in the virtual world, and initializes the orientation of the first virtual camera such that the direction of the line of sight of the first virtual camera is the vertical direction in the virtual world, thereby updating the first virtual camera data Dh. Further, the CPU 5 places a second virtual camera above the far end of the lane in the virtual world, and initializes the orientation of the second virtual camera such that the direction of the line of sight of the second virtual camera is the front direction with the fixation point of the second virtual camera being an area in the vicinity of the pin deck on which the plurality of pin objects OBJ2 are arranged, thereby updating the second virtual camera data Di. Further, on the basis of the data output from the acceleration sensor 14 and representing the acceleration of the terminal apparatus 2, the CPU 5 calculates the direction of gravity applied to the terminal apparatus 2, and calculates and initializes the tilt angle of the terminal apparatus 2 with respect to the direction of gravity (for example, the direction and the angle of tilting the display screen of the terminal apparatus 2 with respect to the horizontal direction), thereby updating the tilt angle data Dc.

Next, the CPU 5 acquires operation data from the terminal apparatus 2, thereby updating the terminal operation data Da (step 42), and proceeds to the subsequent step. For example, the CPU 5 updates the latest data in the touch input data Da1 using data representing the touch position of a touch operation on the touch panel 12. Further, the CPU 5 updates the angular velocity data Da2 using the data output from the gyro sensor 15 and representing the angular velocity generated in the terminal apparatus 2. Further, the CPU 5 updates the acceleration data Da3 using the data output from the acceleration sensor 14 and representing the acceleration generated in the terminal apparatus 2.

Next, the CPU 5 determines whether or not the operation data acquired in the above step 42 indicates a touch operation on the throwing area (step 43). For example, the CPU 5 determines whether or not the operation data acquired in the above step 42 indicates a touch operation on the inside of the throwing area set in the lane (see FIG. 3). Then, if the operation data indicates a touch operation on the throwing area, the CPU 5 proceeds to step 44. If, on the other hand, the operation data does not indicate a touch operation on the throwing area, the CPU 5 proceeds to step 45.

In step 44, the CPU 5 sets the throwing direction and the throwing speed in accordance with the touch operation, and proceeds to step 47. For example, if the touch operation is a touch operation of sliding on the touch panel 12, the CPU 5 determines that a direction, in the virtual world, corresponding to the direction of the slide is the throwing direction, and calculates the throwing speed in accordance with the speed of the slide, thereby updating the throwing direction/speed data Db using the calculated throwing direction and throwing speed. It should be noted that the throwing speed to be calculated in accordance with the speed of the slide may be provided with a predetermined upper limit.

In step 45, the CPU 5 determines whether or not the operation data acquired in the above step 42 indicates either the operation of stopping the touch operation on the throwing area (a touch-off operation on the throwing area), or a touch operation of moving from the inside to the outside of the throwing area (the start of throwing). Then, if it has been determined that the operation data indicates either a touch-off operation on the throwing area or a touch operation of moving from the inside to the outside of the throwing area, the CPU 5 proceeds to step 46. If it has been determined that the operation data indicates neither a touch-off operation nor a touch operation of moving from the inside to the outside of the throwing area, the CPU 5 proceeds to step 47.

In step 46, the CPU 5 starts the movement of a ball object OBJ1 on the basis of the touch position set in the previous processing and the currently set throwing direction and throwing speed, and proceeds to step 47. For example, with reference to the touch input data Da1 and the throwing direction/speed data Db, the CPU 5 acquires the touch position set in the previous processing and the currently set throwing direction and throwing speed. Then, the CPU 5 sets the position, the moving direction, and the moving speed of the ball object OBJ1 in the virtual world such that the ball object OBJ1 moves from a position, in the virtual world, overlapping the touch position in the throwing direction and at the throwing speed, thereby updating the latest position in the history data managed in the ball position data De and the moving direction and the moving speed in the moving direction/speed data Dd.

In step 47, on the basis of the angular velocity data Da2, the CPU 5 calculates the tilt angle of the terminal apparatus 2, and proceeds to the subsequent step. For example, the CPU 5 calculates a new tilt angle by adding the amount of rotation based on the angular velocity data acquired in step 42, to the tilt angle indicated by the tilt angle data Dc (for example, the tilt of the display screen of the terminal apparatus 2 with respect to the horizontal direction), thereby updating the tilt angle data Dc using the new tilt angle. It should be noted that in the above step 47, the CPU 5 may correct the tilt angle every time or at predetermined intervals, using the direction of gravity based on the acceleration data Da3. Alternatively, in the above step 47, the CPU 5 may calculate the tilt angle using only the direction of gravity based on the acceleration data Da3. If the CPU 5 calculates the tilt angle using only the direction of gravity based on the acceleration data Da3, the CPU 5 may perform the above step 47 after the determination is affirmative in step 48 described later.

Next, with reference to the ball position data De, the CPU 5 determines whether or not the ball object OBJ1 is moving in the tilt-operation-allowed area (see FIGS. 3 and 4) (step 48). Then, if the ball object OBJ1 is moving in the tilt-operationallowed area, the CPU 5 proceeds to step 49. If, on the other hand, the ball object OBJ1 is not moving in the tilt-operation-allowed area, the CPU 5 proceeds to step 61 (FIG. 10).

In step 49, the CPU 5 changes the moving direction of the ball object OBJ1 in accordance with the tilt angle of the terminal apparatus 2, and proceeds to the subsequent step. For example, the CPU 5 calculates the angle of tilt of the lane, displayed on the LCD 11, to the left or right with respect to the horizontal direction (for example, the angle of tilt of the display screen of the terminal apparatus 2 with respect to the horizontal direction about a predetermined axis of the terminal apparatus 2 (for example, the X-axis directed in the left-right direction of the terminal apparatus 2 when the lane is displayed such that the left-right direction of the terminal apparatus 2 is the front-back direction of the lane (see FIG. 4))), using the tilt angle indicated by the tilt angle data Dc. Then, the CPU 5 changes the moving direction set in the moving direction/speed data Dd such that the moving direction of the ball object OBJ1 changes by the amount of change based on the angle of tilt of the lane to the left or right and in the direction of the tilt, thereby updating the moving direction. It should be noted that if the ball object OBJ1 is placed in an area where the moving direction of the ball object OBJ1 is fixed in a predetermined direction in the virtual world (for example, an area where the ball object OBJ1 may fall into a gutter), the CPU 5 may set the moving direction as the predetermined direction.

Next, the CPU 5 causes the ball object OBJ1 to move on the basis of the ball position data De and the moving direction/speed data Dd (step 50), and proceeds to the subsequent step. For example, the CPU 5 moves the position of the ball object OBJ1 from the latest position in the virtual world indicated in the history data managed in the ball position data De, in the moving direction indicated by the moving direction/speed data Dd and at the moving speed indicated by the moving direction/speed data Dd, adds data representing the resulting position as the latest position in the history data, and sets the latest position as the position of the ball object OBJ1 to be displayed on the LCD 11.

Next, the CPU 5 moves the first virtual camera in accordance with the latest position of the ball object OBJ1 (step 51), and proceeds to the subsequent step. For example, the CPU 5 sets the position of the first virtual camera immediately above a center position in the lane, which is located ahead, by a predetermined distance in the lane, of the latest position of the ball object OBJ1 set in the above step 50, without changing the distance of the first virtual camera from the lane in the up-down direction, thereby updating the first virtual camera data Dh using the set position.

Next, the CPU 5 determines whether or not the ball object OBJ1 has reached the second line (step 52). Then, if the ball object OBJ1 has reached the second line, the CPU 5 proceeds to step 53. If, on the other hand, the ball object OBJ1 has not reached the second line, the CPU 5 proceeds to step 61 (FIG. 10).

In step 53, the CPU 5 stops the movement of the ball object OBJ1, and sets a flag for displaying an image that prompts the user to view the game image displayed on the monitor 4. Then, the CPU 5 starts the process of initializing the count data in the time count data Dg and thereafter starting to count time, thereby updating the time count data Dg (step 54), and proceeds to step 61 (FIG. 10).

Referring next to FIG. 10, in step 61, with reference to the time count data Dg, the CPU 5 determines whether or not a predetermined time has elapsed. Here, the predetermined time is used to allow the user of the terminal apparatus 2 sufficient time to shift their eyes from the LCD 11 to the monitor 4, and is set to, for example, several seconds. Then, if the predetermined time has elapsed since the counting of time started, the CPU 5 proceeds to step 62. If, on the other hand, the predetermined time has not elapsed or time has not been counted, the CPU 5 proceeds to step 66.

In step 62, the CPU 5 reproduces the movement of the ball object OBJ1 from immediately after the ball object OBJ1 is thrown to when the ball object OBJ1 reaches the second line, and proceeds to the subsequent step. For example, the CPU 5 sets a reproduction display position of the ball object OBJ1 to be displayed on the monitor 4 in order starting from the earliest position data in the history data managed in the ball position data De.

Next, the CPU 5 moves the second virtual camera in accordance with the reproduction display position of the ball object OBJ1 set in the above step 62 (step 63), and proceeds to the subsequent step. As an example, if the earliest position data has been set as the reproduction display position in the history data, the CPU 5 sets the position of the second virtual camera immediately above a center position in the lane, which is located behind the reproduction display position by a predetermined distance in the lane, and sets the direction of the line of sight of the second virtual camera to the front direction of the lane, thereby updating the second virtual camera data Di. Then, during the period until the reproduction display position reaches a predetermined position in the lane, the CPU 5 does not change the position of the second virtual camera. After the reproduction display position reaches the predetermined position, the CPU 5 moves the position of the second virtual camera so as to bring the second virtual camera closer to the reproduction display position, thereby updating the second virtual camera data Di.

Next, the CPU 5 determines whether or not the reproduction display position of the ball object OBJ1 set in the above step 62 has reached the second line (step 64). Then, if the reproduction display position has reached the second line, the CPU 5 proceeds to step 65. If, on the other hand, the reproduction display position has not reached the second line, the CPU 5 proceeds to step 66.

In step 65, in accordance with the moving direction and the moving speed of the ball object OBJ1 when the ball object OBJ1 has reached the second line, the CPU 5 causes the ball object OBJ1 to move into the pin deck, and proceeds to step 66. For example, on the basis of the moving direction and the moving speed of the ball object OBJ1 when the ball object OBJ1 has reached the second line, that is, the moving direction and the moving speed currently set in the moving direction/speed data Dd, the CPU 5 moves the position of the ball object OBJ1 from the position of the ball object OBJ1 having reached the second line, that is, the latest position in the history data managed in the ball position data De, to the inside of the pin deck, adds data representing the resulting position as the latest position in the history data, and sets the latest position as the position of the ball object OBJ1 to be displayed on the monitor 4. It should be noted that in the above step 65, for example, the CPU 5 initializes the count data in the time count data Dg so that the processes of the above steps 62 through 65 will not be performed in the following processing.

In step 66, the CPU 5 determines whether or not the ball object OBJ1 has reached the inside of the pin deck. For example, if the latest position in the history data managed in the ball position data De has crossed the second line, the CPU 5 determines that the ball object OBJ1 has reached the inside of the pin deck. Then, if the ball object OBJ1 has reached the inside of the pin deck, the CPU 5 proceeds to step 67. If, on the other hand, the ball object OBJ1 has not reached the inside of the pin deck, the CPU 5 proceeds to step 68.

In step 67, on the basis of the moving direction and the moving speed of the ball object OBJ1, the CPU 5 causes the ball object OBJ1 to move, and in accordance with the state of collision between the ball object OBJ1 and the pin objects OBJ2, the CPU 5 represents the state where the pin objects OBJ2 are knocked down. Then, the CPU 5 proceeds to step 68. For example, on the basis of the moving direction and the moving speed set in the moving direction/speed data Dd, the CPU 5 moves within the pin deck the position of the ball object OBJ1 from the latest position in the history data managed in the ball position data De. In accordance with the position data of each of the plurality of pin objects OBJ2 indicated by the pin position data Df and the position of the ball object OBJ1 after the movement, the CPU 5 performs collision detection between the ball object OBJ1 and the pin objects OBJ2 and also collision detection among the pin objects OBJ2, and moves the positions of the objects in accordance with the collision detection. Then, the CPU 5 updates the latest position in the ball position data De and the position of each of the pin objects OBJ2 in the pin position data Df, using the calculated positions of the objects.

It should be noted that in the processing described above, the position and the orientation of the second virtual camera are not changed even after the above step 65 is performed or even after the above step 67 is performed. Thus, after the ball object OBJ1 enters the pin deck, the viewpoint and the line of sight of the game image displayed on the monitor 4 are fixed. If, however, the viewpoint and the line of sight of the game image displayed on the monitor 4 are to be changed after the ball object OBJ1 enters the pin deck, the position and/or the orientation of the second virtual camera may be changed after the above step 65 is performed and/or after the above step 67 is performed. In this case, the position and/or the orientation of the second virtual camera may be changed in accordance with the position of the ball object OBJ1 after the ball object OBJ1 enters the pin deck.

In step 68, the CPU 5 generates a terminal apparatus game image to be displayed on the terminal apparatus 2, and proceeds to the subsequent step. For example, the CPU 5 reads, from the memory 6, data indicating the results of the game processing performed in the above steps 42 through 67, and reads, from a VRAM (video RAM) or the like, data necessary for generating a terminal apparatus game image. Then, the CPU 5 generates a terminal apparatus game image using the read data, and stores the generated terminal apparatus game image in the VRAM. As an example, the terminal apparatus game image may be generated as a three-dimensional (or two-dimensional) CG image by: placing the ball object OBJ1 and the pin objects OBJ2 on the lane in the virtual world on the basis of the position in the ball position data De set as the position of the ball object OBJ1 to be displayed on the LCD 11 and the positions indicated by the pin position data Df; and calculating the virtual world viewed from the first virtual camera placed on the basis of the first virtual camera data Dh. It should be noted that if a flag for displaying an image that prompts the user to view the game image displayed on the monitor 4 is set, the CPU 5 generates a display image obtained by reducing the visibility of the terminal apparatus game image generated immediately before the flag has been set, and superimposes on the generated display image a character image that prompts the user to view the game image displayed on the monitor 4 (see FIGS. 5 and 6), thereby generating a terminal apparatus game image to be displayed on the LCD 11.

Next, the CPU 5 generates a monitor game image to be displayed on the monitor 4 (step 69), and proceeds to the subsequent step. For example, the CPU 5 reads, from the memory 6, data indicating the results of the game processing performed in the above steps 42 through 67, and reads, from the VRAM or the like, data necessary for generating a monitor game image. Then, the CPU 5 generates a monitor game image using the read data, and stores the generated monitor game image in the VRAM. As an example, the monitor game image may be generated as a three-dimensional CG image by: placing the ball object OBJ1 and the pin objects OBJ2 on the lane in the virtual world on the basis of the position in the ball position data De set as the position of the ball object OBJ1 to be displayed on the monitor 4 and the positions indicated by the pin position data Df; and calculating the virtual world viewed from the second virtual camera placed on the basis of the second virtual camera data Di.

Next, the CPU 5 transmits the terminal apparatus game image to the terminal apparatus 2 (step 70), and proceeds to the subsequent step. For example, the terminal apparatus game image is received by the terminal apparatus 2, and is output to and displayed on the LCD 11. It should be noted that the terminal apparatus game image may be subjected to a predetermined compression process when transmitted from the information processing apparatus 3 to the terminal apparatus 2. In this case, data of the terminal apparatus game image subjected to the compression process is sent to the terminal apparatus 2, and is subjected to a predetermined decompression process by the terminal apparatus 2. Thereafter, the terminal apparatus game image is displayed.

Next, the CPU 5 outputs the monitor game image to the monitor 4 (step 71), and proceeds to the subsequent step. For example, the monitor game image is acquired by the monitor 4, and is output to and displayed on the display screen of the monitor 4.

Next, the CPU 5 determines whether or not the game is to be ended (step 72). A game in the game processing refers to the period from when the operation of throwing the ball object OBJ1 is performed to when the number of pin objects OBJ2 knocked down by the ball object OBJ1 thrown once by the throwing operation is definitively determined. Thus, the number of pin objects OBJ2 is defined as the result of the game. Then, in the above step 72, examples of conditions for ending the game include: the definitive determination of the result of the game; and the fact that the user has performed the operation of ending the game. If the game is not to be ended, the CPU 5 returns to the above step 42, and repeats the process thereof. If the game is to be ended, the CPU 5 ends the processing indicated in the flow chart. Thereafter, the CPU 5 repeatedly performs a series of processes of steps 42 through 72 until it is determined in step 72 that the game is to be ended.

It should be noted that in the above exemplary embodiment, the information processing system 1 includes only one terminal apparatus 2. Alternatively, the information processing system 1 may be configured to include a plurality of terminal apparatuses 2. That is, the information processing apparatus 3 may be capable of wirelessly communicating with each of the plurality of terminal apparatuses 2, and may transmit image data to the terminal apparatus 2 and receive terminal operation data from the terminal apparatus 2. Then, lanes different from each other may be set for the terminal apparatuses 2 and displayed on the respective LCDs 11, and the CPU 5 may alternately prompt users to perform the operation of throwing the ball object OBJ1, thereby displaying on the monitor 4 the reproduction images of the lanes on which the throwing operations have been performed. In this case, when the information processing apparatus 3 wirelessly communicates with each of the plurality of terminal apparatuses 2, the information processing apparatus 3 may perform the wireless communication with the terminal apparatus 2 in a time division manner or in a frequency division manner.

In addition, the terminal apparatus 2 described above functions as a so-called thin client terminal, which does not perform the series of processes described with reference to FIGS. 9 and 10 or the information processing performed by the information processing apparatus 3. For example, if information processing is executed by a plurality of information processing apparatuses, it is necessary to synchronize the processing executed by the information processing apparatuses, which complicates the processing. In contrast, as in the above exemplary embodiment, if information processing is executed by one information processing apparatus 3, and the terminal apparatus 2 receives and displays an image (that is, if the terminal apparatus 2 is a thin client terminal), it is not necessary to synchronize the processing among a plurality of information processing apparatuses, which can simplify the processing. The terminal apparatus 2, however, may be an apparatus having the function of performing predetermined information processing by a predetermined program (a game program or an information processing program), such as a handheld game apparatus. In this case, in the above exemplary embodiment, at least some of the series of processes to be performed by the information processing apparatus 3 may be performed by the terminal apparatus 2. As an example, if a game image is displayed on each of a plurality of terminal apparatus, using at least one terminal apparatus capable of executing all of the series of processes described above, one of the terminal apparatuses capable of executing all of the series of processes serves as a main process execution apparatus that executes the series of processes, so that the main process execution apparatus transmits game images based on the orientations of and operations on the other terminal apparatuses to the other terminal apparatuses. This makes it possible to output a similar game image to each of the terminal apparatuses and display the game image on the terminal apparatus.

It should be noted that the above descriptions are given using the example where the information processing apparatus 3 performs the information processing. Alternatively, another apparatus other than the terminal apparatus 2 may perform at least some of the processing steps in the processing. For example, if the information processing apparatus 3 is further configured to communicate with another apparatus other than the terminal apparatus 2 (for example, another server, another game apparatus, or another mobile terminal), the other apparatus may cooperate to perform the processing steps in the processing. Another apparatus may thus perform at least some of the processing steps in the processing, which enables processing similar to that described above. Further, the processing described above can be performed by a processor or the cooperation of a plurality of processors, the processor and the plurality of processors contained in an information processing system including at least one information processing apparatus. Further, in the exemplary embodiment, the processing indicated in the flow chart described above is performed by the CPU 5 of the information processing apparatus 3 executing a predetermined game program. Alternatively, some or all of the game processing indicated in the flow chart may be performed by a dedicated circuit included in the information processing apparatus 3.

Here, the above variations make it possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a handheld information processing apparatus (a handheld game apparatus) by the cooperation of the apparatuses. It should be noted that, in these system forms, there is no particular limitation on which apparatus performs the process of each step of the processing described above. Thus, it goes without saying that it is possible to achieve the exemplary embodiment by sharing the processing in any manner.

In addition, the processing orders, the setting values, the conditions used in the determinations, and the like that are used in the game processing described above are merely illustrative. Thus, it goes without saying that the exemplary embodiment can be achieved also with other orders, other values, and other conditions. Further, the exemplary embodiment is described above taking a bowling game as an example of the game processing. Alternatively, the exemplary embodiment can be achieved not only by game processing but also by general information processing.

In addition, the program may be supplied to the information processing apparatus 3 not only through an external storage medium such as the external memory 45, but also through a wired or wireless communication link. Further, the program may be stored in advance in a non-volatile storage device included in the information processing apparatus 3. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, a game program, a game apparatus, a game system, and a game processing method in order, for example, not only for a user operating a game apparatus to enjoy the content of a game, but also for another person to share the content of the game.

What is claimed is:

1. A non-transitory computer-readable storage medium having stored therein a game program to be executed by a computer of an apparatus for causing an image to be displayed on each of a display screen of a portable apparatus and a separate display monitor other than the portable apparatus, the game program causing the computer to perform at least:
   acquiring an input;
   performing, in accordance with the input, a sequence of game processing from beginning a predetermined game until obtaining a particular result of game processing;
   displaying on the portable apparatus game images depicting game processes occurring from the beginning of the game up until a particular event state within the game in progress prior to obtaining the particular result of game processing; and
   redisplaying on the separate display monitor game images depicting at least part of the game processes occurring from the beginning of the game up until the particular event state within the game in progress, and thereafter displaying on the separate display monitor game images depicting game processes occurring up until the obtaining of the particular result of the game processing.

2. The non-transitory computer-readable storage medium having stored therein the game program according to claim 1, wherein
   in the display on the other display apparatus, after the game image corresponding to the game processing from the beginning of the game to the state of the game still in progress is displayed in the display on the portable display apparatus, the game image corresponding to the at least part of the game processing from the beginning of the game to the state of the game still in progress is redisplayed on the other display apparatus.

3. The non-transitory computer-readable storage medium having stored therein the game program according to claim 1, wherein
   in the display on the portable display apparatus, after the game image corresponding to the game processing from the beginning of the game to the state of the game still in progress is displayed, a visibility of an image to be displayed on the portable display apparatus is reduced.

4. The non-transitory computer-readable storage medium having stored therein the game program according to claim 3, wherein
   in the display on the portable display apparatus, the visibility of the image to be displayed on the portable display apparatus is reduced by reducing a brightness of the image.

5. The non-transitory computer-readable storage medium having stored therein the game program according to claim 3, wherein
   in the display on the portable display apparatus, the visibility of the image to be displayed on the portable display apparatus is reduced by hiding the image.

6. The non-transitory computer-readable storage medium having stored therein the game program according to claim 1, wherein
   in the display on the portable display apparatus, after the game image corresponding to the game processing from the beginning of the game to the state of the game still in progress is displayed, a stopped image is displayed on the portable display apparatus, the stopped image obtained by stopping progression of the game at the time of the state of the game still in progress.

7. The non-transitory computer-readable storage medium having stored therein the game program according to claim 1, wherein
   in the performance of the sequence of the game processing, the sequence of the game processing is performed in accordance with the input acquired from the beginning of the game to a predetermined time before the result of the game is obtained; and
   in the display on the portable display apparatus, a game image corresponding to the game processing from the beginning of the game to the predetermined time is displayed on the portable display apparatus.

8. The non-transitory computer-readable storage medium having stored therein the game program according to claim 1, wherein
   in the display on the other display apparatus, a game image is displayed on the other display apparatus, the game image obtained by viewing a virtual world from a direction different from a direction from which the game image displayed in the display on the portable display apparatus is viewed.

9. The non-transitory computer-readable storage medium having stored therein the game program according to claim 1, wherein
   in the display on the other display apparatus, while the game image corresponding to the game processing from the beginning of the game to the state of the game still in progress is displayed in the display on the portable display apparatus, a game image is displayed on the other display apparatus, the game image including a location where the result of the game is represented.

10. The non-transitory computer-readable storage medium having stored therein the game program according to claim 8, wherein
in the display on the portable display apparatus, a game image is displayed on the portable display apparatus, the game image obtained by changing a viewpoint of the game image with a direction of a line of sight of the game image fixed until the state of the game still in progress.

11. The non-transitory computer-readable storage medium having stored therein the game program according to claim 1, wherein
the other display apparatus is a stationary display apparatus.

12. The non-transitory computer-readable storage medium having stored therein the game program according to claim 1, wherein
in the acquisition of the input, an input using the portable display apparatus is acquired.

13. A game apparatus for causing an image to be displayed on each of a display screen of a portable apparatus and a separate display monitor other than the portable apparatus, the game apparatus including one or more processing units configured to perform functions and operate as:
an acquisition unit configured to acquire an input;
a game processing unit configured to perform, in accordance with the input, a sequence of game processing from beginning a predetermined game until obtaining a particular result of game processing;
a first game image display control unit configured to display on the portable apparatus game images depicting game processes occurring from the beginning of the game up until a particular event state within the game in progress prior to obtaining the particular result of game processing; and
a second game image display control unit configured to redisplay on the separate display monitor game images depicting at least part of the game processes occurring from the beginning of the game up until the particular event state within the game in progress, and thereafter displaying on the separate display monitor game images depicting game processes occurring up until the obtaining of the particular result of the game processing.

14. A game system, including a plurality of apparatuses configured to communicate with each other, for causing an image to be displayed on each of a display screen of a portable apparatus and a separate display monitor other than the portable apparatus, the game system comprising one or more processing units configured to perform functions and operate as:
an acquisition unit configured to acquire an input;
a game processing unit configured to perform, in accordance with the input, a sequence of game processing from beginning a predetermined game until obtaining a particular result of game processing;
a first game image display control unit configured to display on the portable apparatus game images depicting game processes occurring from the beginning of the game up until a particular event state within the game in progress prior to obtaining the particular result of game processing; and
a second game image display control unit configured to redisplay on the separate display monitor game images depicting at least part of the game processes occurring from the beginning of the game up until the particular event state within the game in progress, and thereafter displaying on the separate display monitor game images depicting game processes occurring up until the obtaining of the particular result of the game processing.

15. A game processing method to be executed by a processor or a cooperation of a plurality of processors of an information processing system configured to provide an image to be displayed on each of a display screen of a portable apparatus and a separate display monitor other than the portable apparatus, the game processing method comprising:
acquiring an input;
performing, in accordance with the input, a sequence of game processing from beginning a predetermined game until obtaining a particular result of game processing;
displaying on the portable apparatus game images depicting game processes occurring from the beginning of the game up until a particular event state within the game in progress prior to obtaining the particular result of game processing; and
redisplaying on the separate display monitor game images depicting at least part of the game processes occurring from the beginning of the game up until the particular event state within the game in progress, and thereafter displaying on the separate display monitor game images depicting game processes occurring up until the obtaining of the particular result of the game processing.

16. The non-transitory computer-readable storage medium having stored therein the game program according to claim 1, wherein in the display screen on the portable apparatus, the game images depicting game processes performed from the beginning of the game up until the particular event state within the game in progress is displayed on the portable apparatus, and a game process image corresponding to game processing performed after the particular event state occurs is prevented from being displayed on the portable apparatus, and
in the display on the separate display monitor, after ending of a displaying of game processes occurring up until the particular event state upon the portable apparatus, the game images depicting the at least part of the game processes occurring from the beginning of the game up until the particular event state within the game in progress are redisplayed on the separate display monitor, and immediately thereafter images depicting the game processes occurring from after the particular event state up until the obtaining of the particular result of the game processing is then also displayed on the separate display monitor continuing from the redisplayed game images.

* * * * *